US 8,210,738 B2

(12) United States Patent  (10) Patent No.: US 8,210,738 B2
Hoefken  (45) Date of Patent: Jul. 3, 2012

(54) HORIZONTAL AGITATOR AND METHOD FOR PRODUCING A FLOW IN A CLEARING BASIN USING THE HORIZONTAL AGITATOR

(75) Inventor: Marcus Hoefken, Erlangen (DE)

(73) Assignee: Invent Umwelt-und Verfahrenstechnik AG, Erlangen (DE)

( * ) Notice: Subject to any disclaimer, the term of this patent is extended or adjusted under 35 U.S.C. 154(b) by 492 days.

(21) Appl. No.: 12/449,325

(22) PCT Filed: Feb. 14, 2008

(86) PCT No.: PCT/EP2008/001128
§ 371 (c)(1),
(2), (4) Date: Aug. 31, 2009

(87) PCT Pub. No.: WO2008/101632
PCT Pub. Date: Aug. 28, 2008

(65) Prior Publication Data
US 2010/0096343 A1 Apr. 22, 2010

(30) Foreign Application Priority Data
Feb. 19, 2007 (DE) .......................... 10 2007 008 134

(51) Int. Cl.
B01F 7/06 (2006.01)
(52) U.S. Cl. .................................. 366/330.3; 366/330.5
(58) Field of Classification Search ..... 366/330.1–330.7
See application file for complete search history.

(56) References Cited

U.S. PATENT DOCUMENTS

| 3,108,146 | A | * | 10/1963 | Gross | 261/24 |
| 4,566,801 | A | | 1/1986 | Salzman | |
| 4,627,791 | A | | 12/1986 | Marshall | |
| 4,671,872 | A | | 6/1987 | Cramer et al. | |
| 6,231,268 | B1 | * | 5/2001 | Hausenbauer | 405/61 |
| 2010/0096343 | A1 | * | 4/2010 | Hoefken | 210/787 |
| 2010/0133174 | A1 | * | 6/2010 | Hoefken | 210/512.3 |

FOREIGN PATENT DOCUMENTS

| DE | 39 31 918 A1 | 1/1991 |
| DE | 40 15 478 C1 | 8/1991 |
| EP | 0 295 247 B1 | 5/1992 |
| WO | WO 99/20523 | 4/1999 |

* cited by examiner

Primary Examiner — David Sorkin
(74) Attorney, Agent, or Firm — Manabu Kanesaka

(57) ABSTRACT

The invention relates to a horizontal agitator for producing a flow in a clearing basin, wherein a propeller (2) having a plurality of blades (4) is connected to a submersible motor (1) axially disposed thereto. In order to increase the efficiency of the horizontal agitator, according to the invention the propeller (2) and the submersible motor (1) are configured such that during operation of the submersible motor (1) a flow (P2) that is directed from the propeller (2) to the submersible motor (1) is produced.

21 Claims, 5 Drawing Sheets

Figure 13:
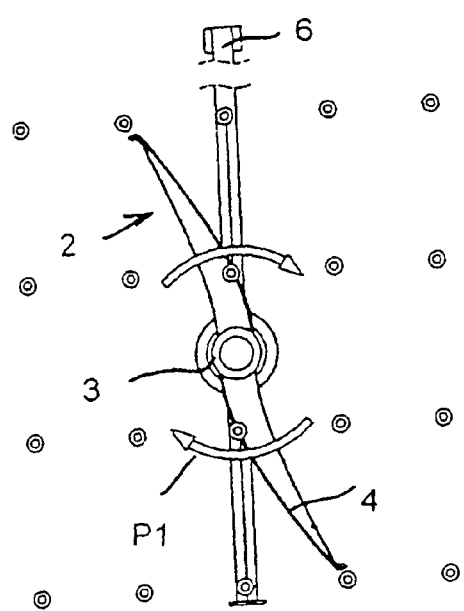

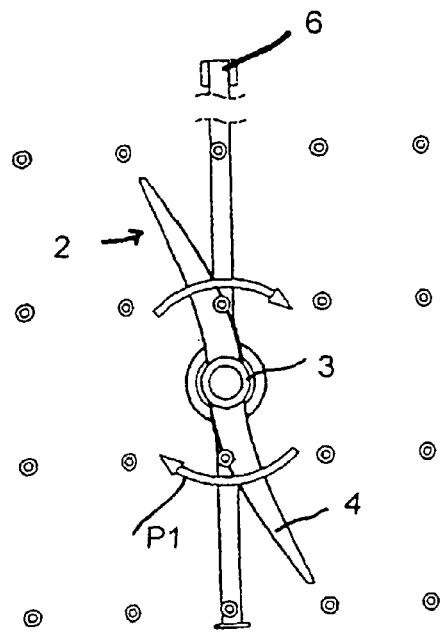
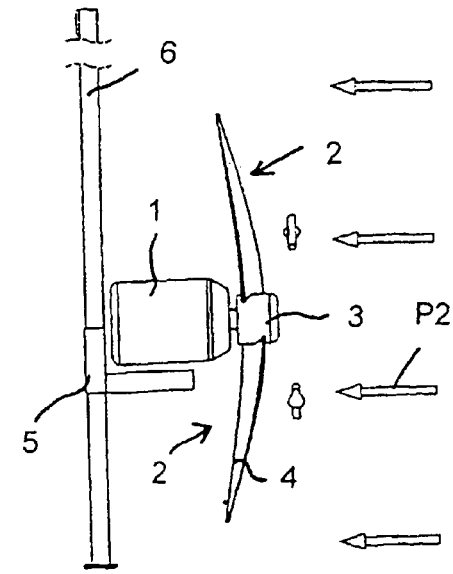
Fig. 1
Fig. 2
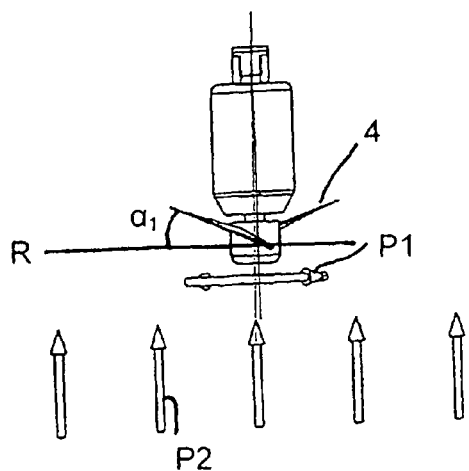
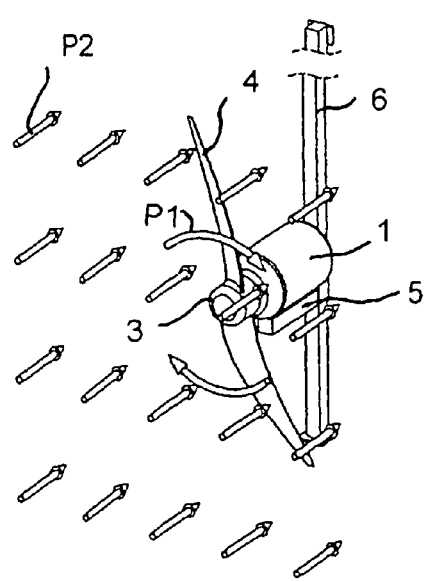
Fig. 3
Fig. 4

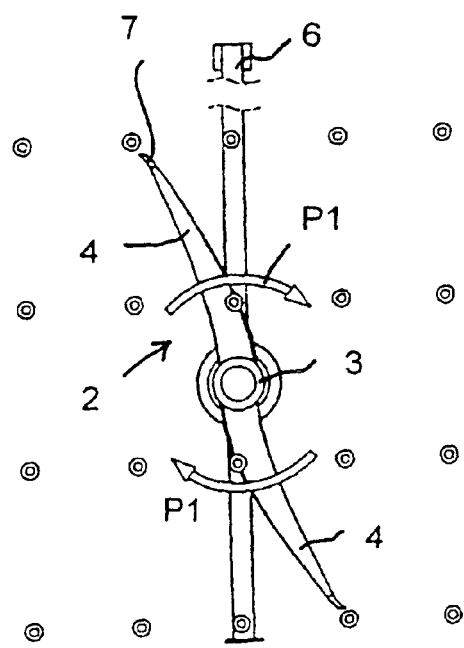
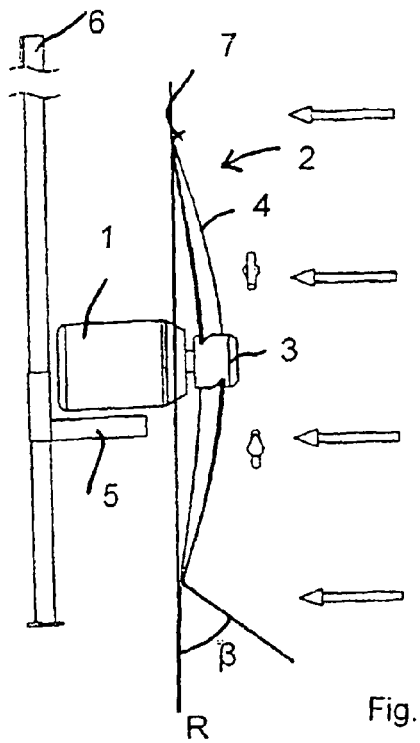
Fig. 5
Fig. 6
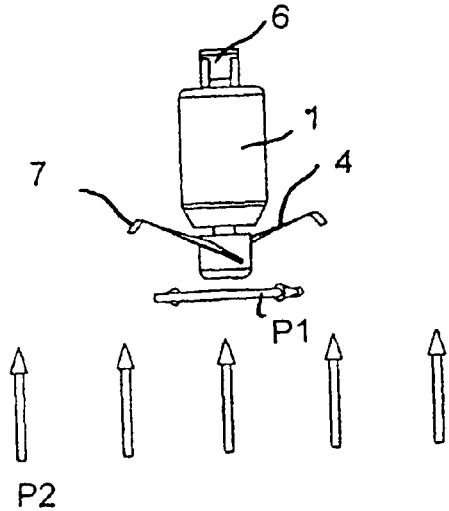
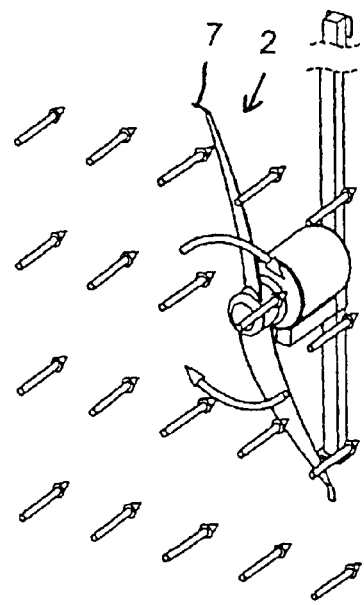
Fig. 7
Fig. 8

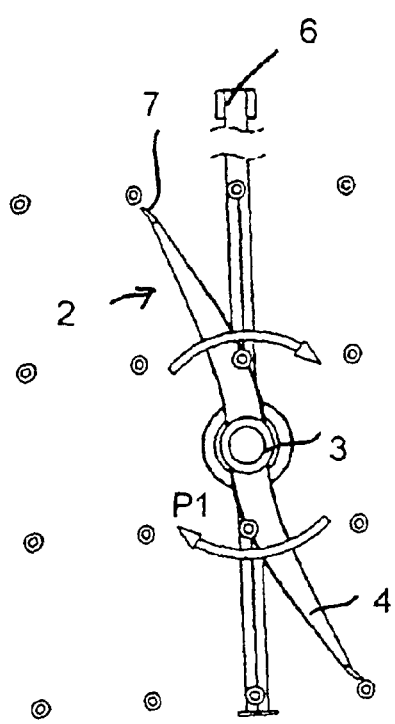
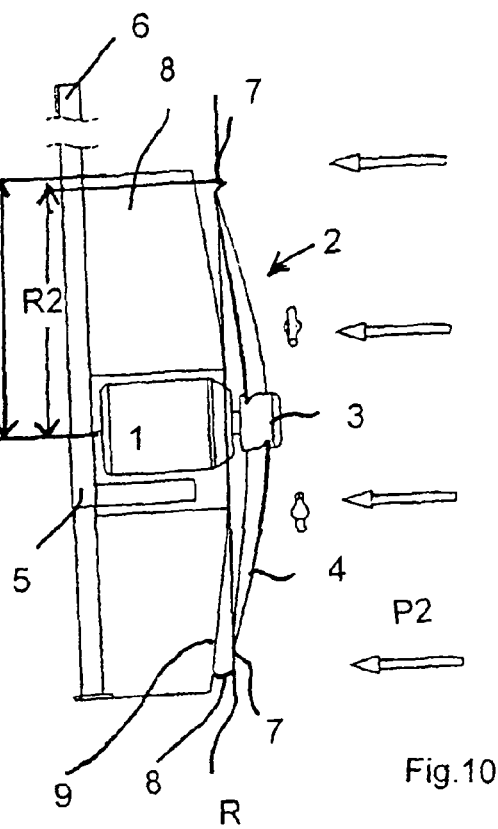
Fig. 9
Fig. 10
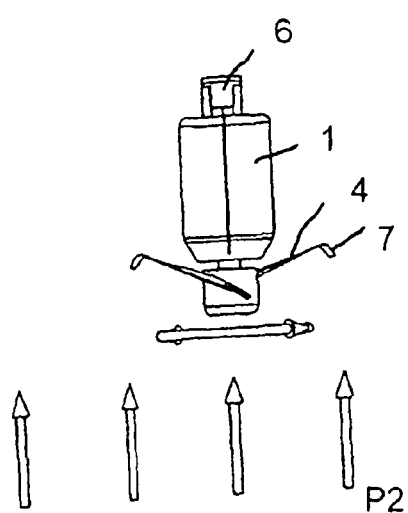
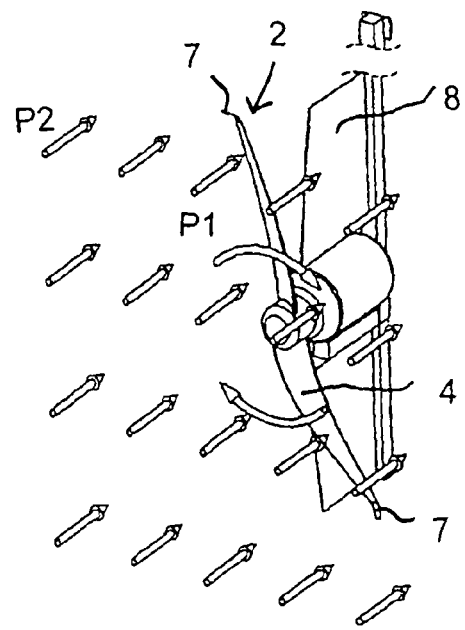
Fig. 11
Fig. 12

HORIZONTAL AGITATOR AND METHOD FOR PRODUCING A FLOW IN A CLEARING BASIN USING THE HORIZONTAL AGITATOR

The first aspect of the invention relates to a horizontal agitator. Moreover, the second aspect relates to a method for producing a flow in a clearing basin.

A horizontal agitator is known from DE 40 15 478 C1. In this connection a propeller is connected to a drive unit. The drive unit comprises a submersible motor which usually drives the propeller via a gear unit. In this connection the submersible motor is arranged axially to the propeller i.e., a drive shaft of the submersible motor runs essentially parallel to a rotary axis of the propeller.

In addition, horizontal agitators are also known which, although the submersible motor is axially displaced in relation to the propeller, it is not, however, arranged in a horizontal plane running through a rotary axis of the propeller, i.e., in this case, the submersible motor is arranged either below or above the horizontal plane running through the rotary axis of the propeller.

Conventional horizontal agitators are attached to a frame which is mounted in the vicinity of the wall of a clearing basin or on a bridge. A horizontal flow directed from the submersible motor or from the frame to the propeller is produced by the action of the propeller.

The efficiency of the known horizontal agitators is not particularly high. Apart from this, conventional horizontal agitators are not particularly universal. To obtain the best possible efficiency, it is, in accordance with prior art, required to select a suitable propeller based on the size of the clearing basin and to operate this propeller at a specified speed suitable for this purpose. Each horizontal agitator must thus be designed for the particular application. That is expensive and time-consuming.

An object of the invention is to eliminate the disadvantages in accordance with prior art. In particular, a horizontal agitator and a method are to be specified which can produce a horizontal flow in a clearing basin with improved efficiency. A further goal of the invention is to provide a horizontal agitator which is usable as universally as possible.

This object is solved by the features in the first and second aspects. Useful embodiments result from the features in the third aspect.

In accordance with the provisions of the invention, it is provided that the propeller and the submersible motor are configured such that during operation of the submersible motor a flow is produced which is directed from the propeller to the submersible motor. With this, it is surprisingly easy to significantly improve the efficiency of a horizontal agitator. The reason for the improvement of efficiency is essentially that, in accordance with the subject-matter of the invention, no flow hindrances, in particular the submersible motor as well as a frame for holding the submersible motor, are located on the suctioning side of the propeller. As a result of this, a larger amount of liquid can be suctioned in per time unit and can be accelerated in horizontal direction.

In accordance with an advantageous embodiment, it is provided that an elastic deformation of the blades made of elastically deformable material is set so that, at least in the area of a radial, outer section, their profile pitch angle increases in a specified manner with increasing rotation speed. The term "profile pitch angle" is understood to mean an angle with which the blades are set or tilted in relation to a radial plane running perpendicularly to the rotary axis of the propeller. Due to the defined setting of the specified elastic deformation of the blades, it can be achieved that the propeller not only can be operated at a certain rotation speed but within a range of rotation speed or range of number of revolutions with a high efficiency. The pressure of the liquid on the blades increases with increasing rotation speed. Due to their elasticity set in a defined way, a profile pitch angle of the blades increases in a radial, outer area. With this, the profile of the blades adjusts to the particular conditions so that a flow can be produced over a wide range of number of revolutions. This makes it possible to operate the suggested horizontal agitator universally in clearing basins of different sizes without having to provide another propeller. This saves manufacturing costs.

The propeller can have two, three, four, five or more blades. The propeller can be a counter-clockwise or clockwise rotating propeller. Usefully, the blades are made of a fiber-reinforced composite material. The matrix of the composite material is usefully made of plastic. This can be conventionally known resins which are suitable for the manufacturing of composite materials, e.g., epoxy resins and similar. As fibers, the composite material can contain carbon and/or aramid and/or highly stretched polyethylene fibers. The setting of the elastic deformation of the blades can be done by the selection, the amount and the arrangement of the fibers. Moreover, the elastic deformation, in particular the elastic deformation of the pitch angle, can be set by the thickness of the profile. To set the desired elastic deformation of a blade, a surface of the blade can be separated into surface elements and a modulus of elasticity can be assigned to each surface element. During manufacturing, the particular modulus of elasticity can then be set by varying the type, amount and arrangement of the fibers as well as the thickness of the profile.

The propeller usefully has a density ranging from 0.9 to 1.1 g/cm$^3$. With this, the density essentially corresponds to the density of the liquid medium surrounding the propeller, in particular the waste water to be clarified. The suggested adaption of the density of the propeller to the surrounding liquid medium prevents a radial force caused by the difference in density from being exerted on the propeller axis. This increases the life of bearings holding the propeller axis.

In accordance with a further advantageous embodiment feature, radial, outer end sections of the blades are bent in a direction opposite to the axial main flow direction produced by the propeller. This can prevent the generation, in the area of the blade ends, of undesired radial and axial side flows opposite to the main flow direction. Such side flows decrease the efficiency of the propeller. The suggested bending of the blade ends is particularly used for rigid blades whose profile pitch angle does not essentially change with increased rotation speed.

The term "end section" is understood to mean a radial, outer area of the blade containing the tip of the blade. The "end section" usually has a shorter radial length than the "radial, outer section." However, it can also be that the "radial, outer section" has the same length as the "end section." With a combination of the elastic deformation of the blades with the bending of the end sections, the blade is designed so that a bending of the end sections opposite to the axial main flow direction still exists even with a maximum elastic deformation of the blades.

In accordance with a further embodiment, the bent end sections have a curve opposite to the rotating direction of the propeller in a radial plane. This provides a simple way to prevent so-called "braid-generating impurities," such as thread, string, hair and similar, from being caught by the bent end section.

It has proven to be useful that a maximum length of the end section is ⅕ of the radius of the blade. Such a length of the end section has already proven to be sufficient to effectively counteract undesired side flows.

It is advantageous that the submersible motor is attached axially to the propeller, i.e., the submersible motor is located downstream of the propeller in the area of a hub of same. The drive shaft of the submersible motor and the rotary axis of the propeller are parallel to or are located on one and the same axis.

In accordance with a further embodiment, it is provided that two propellers rotating in opposite directions around the same rotary axis are provided to produce the flow directed towards the submersible motor. The one propeller is rotating clockwise and the other propeller is rotating counterclockwise so that, in the sense of this invention, both propellers produce a flow directed towards the submersible motor. The suggested "double propeller arrangement" makes it particularly efficient and simple to counteract the formation of a spiral-shaped or so-called "braided flow."

According to a further embodiment, plate-shaped flow conducting elements extending in at least one axial plane are provided downstream of the at least one propeller. The term "axial plane" is understood to mean a plane which runs parallel to the rotary axis of the propeller or contains the rotary axis. The formation of braided flows is counteracted by the provision of plate-shaped flow conducting elements. Braided flows are not desired since they reduce the efficiency of the agitator.

The flow conducting elements are usefully made of sheet metal or fiber-reinforced plastic. They can extend in a vertical plane and/or a horizontal plane. The flow conducting elements can be attached to a frame holding the submersible motor or also to the bottom of a clearing basin. But the flow conducting elements can also be attached to the submersible motor or to a drive unit comprising the submersible motor. The drive unit can comprise a gear unit, for example, in addition to the submersible motor.

The submersible motor or the drive unit can be fixed to a vertical movement unit provided on the frame. This makes it possible to lift or lower the horizontal agitator in the clearing basin.

In accordance with a further embodiment, it is provided that, with increasing radial distance, a leading edge of the flow conducting elements has an inclination or curve directed to the main flow direction. This ensures that no braid-generating impurities can collect on the flow conducting elements. On the contrary, the flow moves them along the inclined or curved leading edge until they are washed away by the flow conducting element.

In accordance with further provisions of the invention, an arrangement for clarifying waste water having a clearing basin and having accommodated therein at least one horizontal agitator according to the invention is provided.

Moreover, the invention provides a method for producing a flow in a clearing basin using a horizontal agitator, wherein a propeller with a plurality of blades is connected to a submersible motor arranged axially thereto, wherein the propeller is rotated by the submersible motor such that a flow that is directed from the propeller to the submersible motor is produced.

In accordance with an advantageous embodiment, the specified horizontal agitator provided by the invention is used to produce the flow.

Figure 14:
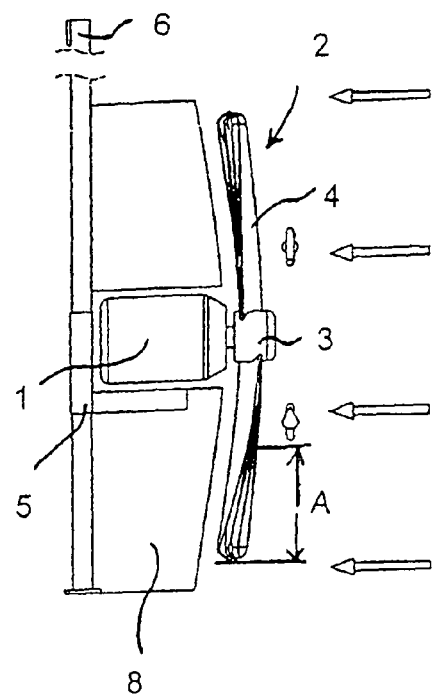
Figure 15:
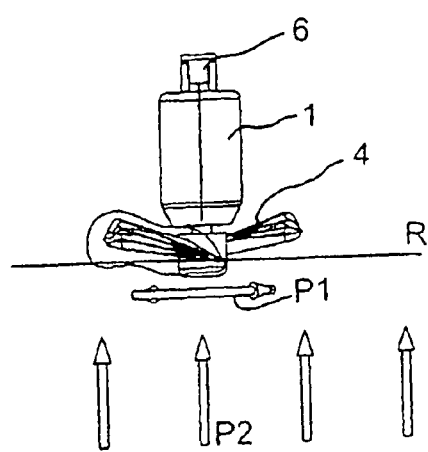
Figure 16:
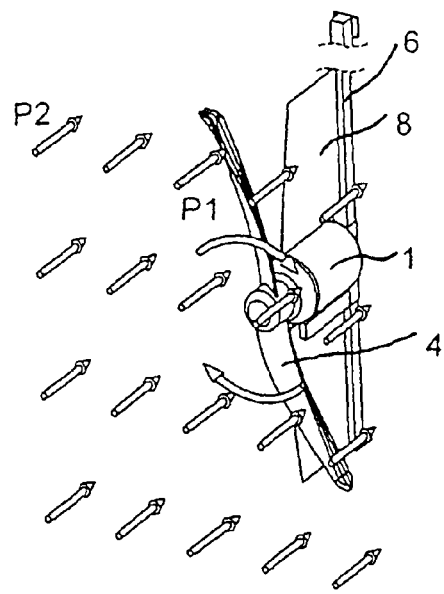
Figure 17:
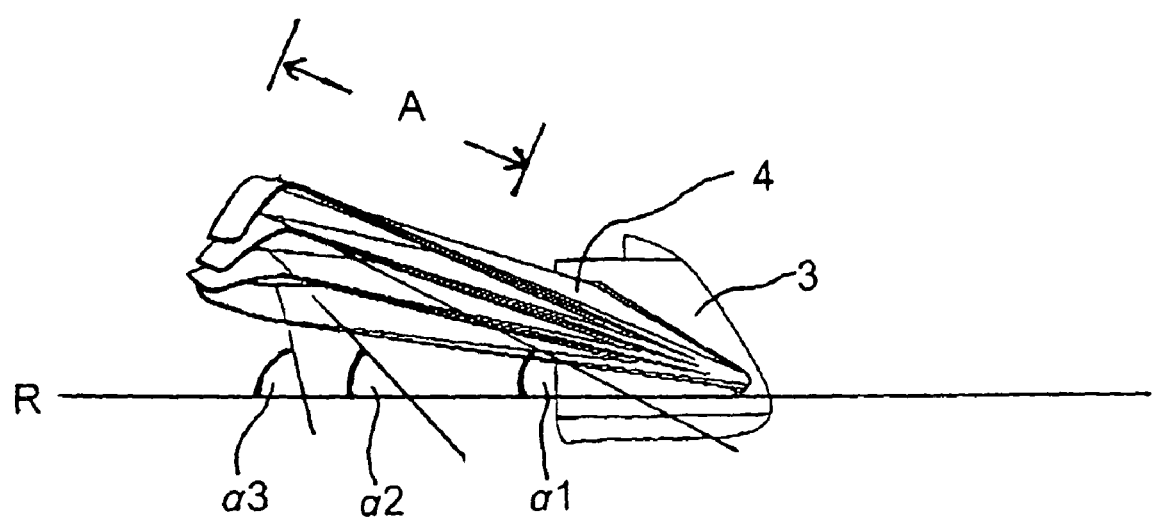

The invention will now be described in more detail using exemplary embodiments based on the drawings:

FIG. 1 A front view of a first horizontal agitator,

FIG. 2 a side view as per FIG. 1,

FIG. 3 a top view as per FIG. 1,

FIG. 4 a view in perspective of the first horizontal agitator as per FIG. 1,

FIG. 5 a front view of a second horizontal agitator,

FIG. 6 a side view as per FIG. 5,

FIG. 7 a top view as per FIG. 5,

FIG. 8 a view in perspective of the second horizontal agitator as per FIG. 5,

FIG. 9 a front view of a third horizontal agitator,

FIG. 10 a side view as per FIG. 9,

FIG. 11 a top view as per FIG. 9,

FIG. 12 a view in perspective of the third horizontal agitator as per FIG. 9,

FIG. 13 a front view of a fourth horizontal agitator,

FIG. 14 a side view as per FIG. 13,

FIG. 15 a top view as per FIG. 13,

FIG. 16 a view in perspective of the fourth horizontal agitator as per FIG. 13 and FIG. 17 a detailed view as per FIG. 16.

With the first horizontal agitator shown in FIGS. 1 to 4, there is a submersible motor 1 connected in axial arrangement with a propeller 2 as a drive. The propeller 2 has two blades 4 extending radially from a hub 3. The submersible motor 1 is mounted on a carriage 5 which can be moved vertically via a vertical movement unit (not shown here) on a column-like frame 6. A possible embodiment of a suitable vertical movement unit is, for example, described in DE 40 15 478 C1 whose disclosure is incorporated herewith.

As shown in FIG. 3, a first profile pitch angle α1 of the blades 4 in relation to a radial plane R and a rotating direction of propeller 2 suggested by the arrows P1, and brought about by the submersible motor 1 are selected so that a horizontal main flow direction shown by the second arrows P2 is produced by propeller 2 in the direction of the submersible motor 1. As can be clearly seen in FIGS. 1 to 4, there is no flow hindrance on the suction side of the propeller 2 so that, in this way, liquid can be efficiently accelerated in a horizontal direction as per the second arrows P2.

With the second horizontal agitator shown in FIGS. 5 to 8, radial, outer end sections 7 of the blades 4 are bent in a direction opposite to the main flow direction suggested by the second arrows P2. The aforementioned horizontal main flow direction P2 runs essentially parallel to the also horizontally running, rotary axis of the propeller 2. As is particularly shown in FIG. 6, a bending angle β is positioned at an angle of about 55° here in relation to a radial plane R. However, the bending angle β can also be larger or smaller and is preferably within a range between 30 and 90°. It is particularly shown in FIG. 5 that the end sections 7 have a length which corresponds to a maximum of one fifth of the radius of the blades 4. In the exemplary embodiment which is shown the end sections 7 only extend one tenth of the radial length of the blades 4.

Moreover, the end sections 7 have a curve running opposite to the rotating direction of the rotor 2 as suggested with the arrows P1. The suggested curve counteracts a catching of braid-generating impurities.

FIGS. 9 to 12 show a third horizontal agitator, wherein the propeller 2 is formed the same as with the second horizontal agitator. In turn, the propeller 2 has bent end sections 7. With the third horizontal agitator, plate-shaped flow conducting elements 8 are provided extending downstream of the propeller 2 in an axial plane running through the rotary axis of propeller 2. The flow conducting elements 8 are attached to the column-like frame 6 as shown in the exemplary embodiment. Naturally, it is also possible to fix the flow conducting elements 8 to the submersible motor 1 or to the carriage 5. The flow conducting elements 8 extend from the submersible motor 1 in the radial direction to a first radius R1 which is greater than or equal to a second radius R2 of the propeller 2. The first radius R1 can preferably be 1.0 to 1.3 times the second radius R2.

As is particularly shown in FIG. 10, leading edges 9 are positioned at an inclination in relation to the radial plane R. An angle of inclination γ opens radially to the outside and is preferably 5 to 25°. Instead of a straight and inclined leading edge 9, a curved leading edge 9 can also be provided whose curve is directed towards the main flow direction P2.

Instead of the submersible motor 1, a drive unit which comprises a gear unit in addition to the submersible motor 1 can also be provided.

FIGS. 13 to 17 show views of a fourth horizontal agitator. In this connection, the blades 4 of the propeller 2 are made from a composite material in which fibers are contained in a plastic matrix. The elasticity of the blades 4 is set by the suitable selection, combination and arrangement of the fibers in the composite material so that particularly an outer section A is elastically deformed by the pressure of the liquid. When suitable material design is used, the elastic deformation takes place in such that a profile pitch angle of the outer section A increases in relation to the vertical radial plane R running through the rotary axis as the pressure of the liquid increases. As is particularly shown in FIG. 17, in particular an outer section A of the blades 4 twists as the liquid pressure or the speed increases. A first pitch angle α1 specifies the shape of the blades at a low speed. A second pitch angle α2 specifies the shape of the blades at a medium speed. And a third pitch angle α3 specifies the shape of the blades at a high speed. The pitch angle of the blades 4 increases in relation to the radial plane R as the speed or liquid pressure increases.

To set the desired elastic deformation of the blades 4 depending on the action on them by liquid pressure, different fibers, for example carbon and/or aramid and/or highly stretched polyethylene fibers, can be combined with each other. Moreover, the desired elasticity properties can be influenced by the direction and the number of fiber layers as well as by the thickness of the profile.

In accordance with a particularly advantageous embodiment, it is provided that the total propeller has a weight which corresponds to the amount of water or waste water displaced by its volume, i.e., the propeller is so heavy that it will not rise when it is submerged in the waste water. For this purpose, the composite material can be provided with metallic particles or metallic inserts which are made of lead, for example.

LIST OF REFERENCE SIGNS

1 Submersible motor
2 Propeller
3 Hub
4 Blade
5 Carriage
6 Frame
7 End section
8 Flow conducting element
9 Leading edge
R Radial plane
R1 First radius
R2 Second radius
A Outer section
P1 Rotating direction of the propeller
P2 Axial main flow direction
α1 First pitch angle
α2 Second pitch angle
α3 Third pitch angle
β Bending angle
γ Angle of inclination of the leading edge

The invention claimed is:

1. A horizontal agitator for producing a flow in a clearing basin, wherein a propeller (2) having a plurality of blades (4) is connected to a submersible motor (1) arranged axially displaced thereto, wherein the propeller (2) and the submersible motor (1) are configured such that during operation of the submersible motor (1) a flow (P2) is that is directed from the propeller (2) to the submersible motor (1) is produced, characterized in that radial, outer end sections (7) of the blades (4) are bent in a direction opposite to the axial main flow direction (P2) produced by the propeller.

2. A horizontal agitator as defined in claim 1, wherein an elastic deformation of the blades (4) made of an elastic deformable material is set so that their profile pitch angle (α1, α2, α3) increases in a specified manner at least in the area of a radial, outer section (A) with increasing rotation speed.

3. A horizontal agitator as defined in claim 1, wherein the blades (4) are made of a composite material being reinforced with fibers.

4. A horizontal agitator as defined in claim 3, wherein a matrix of the composite material is made of plastic.

5. A horizontal agitator as defined in claim 3, wherein the composite material contains as fibres carbon and/or aramid and/or highly stretched polyethylene fibers.

6. A horizontal agitator as defined in claim 3, wherein an elastic deformation of the blades (4) is set by the selection, amount and arrangement of the fibers.

7. A horizontal agitator as defined in claim 2, wherein the elastic deformation is set by the thickness of the profile.

8. A horizontal agitator as defined in claim 1, wherein the propeller (2) has a density in the range from 0.9 to 1.1 g/cm³.

9. A horizontal agitator as defined in claim 1, wherein the bent end sections (7) have a curve opposite to the rotating direction (P1) of the propeller (2) in a radial plane (R).

10. A horizontal agitator as defined in claim 1, wherein a maximum length of the end section (7) is ⅕ of the radius (R2) of the blade (4).

11. A horizontal agitator as defined in claim 1, wherein the submersible motor (1) is attached axially to the propeller (2).

12. A horizontal agitator as defined in claim 1, wherein two propellers (2) rotating in opposite directions around the same rotary axis are provided to produce the flow (P2) directed towards the submersible motor (1).

13. A horizontal agitator as defined in claim 1, wherein plate-shaped flow conducting elements (8) extending in at least one axial plane are provided downstream of the at least one propeller (2).

14. A horizontal agitator as defined in claim 13, wherein the flow conducting elements (8) are made of sheet metal or fiber-reinforced plastic.

15. A horizontal agitator as defined in the claim 13, wherein the flow conducting elements (8) extend in a vertical plane and/or a horizontal plane.

16. A horizontal agitator as defined in claims 13, wherein the flow conducting elements (8) are attached to the submersible motor (1) or to a drive unit comprising the submersible motor (1).

17. A horizontal agitator as defined in claim 1, wherein the submersible motor (1) or the drive unit is fixed to a vertical movement unit (5) provided on a frame (6).

18. A horizontal agitator as defined in claim 17, wherein the flow conducting elements (8) are attached to the frame (6) holding the submersible motor (1).

19. A horizontal agitator as defined in claim 13, wherein, with increasing radial distance, a leading edge (9) of the flow conducting elements (8) has an inclination (B) or curve directed to the main flow direction (P2).

20. An arrangement for clarifying waste water having a clearing basin and having accommodated therein at least one horizontal agitator as defined in claim 1.

21. A method for producing a flow in a clearing basin using a horizontal agitator, wherein a propeller (2) having a plurality of blades (4) is connected to a submersible motor (1) arranged axially thereto, wherein the propeller (2) is rotated by the submersible motor (1) such that a flow (P2) that is directed from the propeller (2) to the submersible motor (1) is produced, characterized in that a horizontal agitator as defined in claim 1 is used to produce the flow (P2).

\* \* \* \* \*